US012802244B2

(12) United States Patent
Jiang et al.

(10) Patent No.: US 12,802,244 B2
(45) Date of Patent: Nov. 17, 2026

(54) SYSTEM AND METHOD FOR IN-SITU SWATH POSITIONING

(71) Applicant: KLA Corporation, Milpitas, CA (US)

(72) Inventors: Jun Jiang, Chapel Hill, NC (US); Wei Qin, San Jose, CA (US); Charlie Shuiyao Huang, Fremont, CA (US); Carlo Lopez-Tello Gomez, Las Vegas, NV (US); Huan Jin, Dublin, CA (US); Kai Cao, Fremont, CA (US); Xiaochun Li, San Jose, CA (US); Sangbong Park, Danville, CA (US)

(73) Assignee: KLA Corporation, Milpitas, CA (US)

( * ) Notice: Subject to any disclaimer, the term of this patent is extended or adjusted under 35 U.S.C. 154(b) by 247 days.

(21) Appl. No.: 18/824,101

(22) Filed: Sep. 4, 2024

(65) Prior Publication Data

US 2025/0173880 A1 May 29, 2025

Related U.S. Application Data

(60) Provisional application No. 63/603,119, filed on Nov. 28, 2023.

(51) Int. Cl.
*G06T 7/00* (2017.01)
*G06T 7/33* (2017.01)

(52) U.S. Cl.
CPC .............. *G06T 7/33* (2017.01); *G06T 7/0004* (2013.01); *G06T 2207/30148* (2013.01)

(58) Field of Classification Search
CPC ..................... G06T 7/33; G06T 7/0004; G06T 2207/30148; G06T 7/001
See application file for complete search history.

(56) References Cited

U.S. PATENT DOCUMENTS 9,996,942 B2 6/2018 Bhattacharyya et al.
11,049,745 B2 6/2021 Dowling et al.
(Continued)

FOREIGN PATENT DOCUMENTS

EP 3025369 B1 4/2021

OTHER PUBLICATIONS

Korean Intellectual Property Office, International Search Report and Written Opinion received in International Application No. PCT/US2024/056317, Mar. 10, 2025, 11 pages.

*Primary Examiner* — Han Hoang
(74) *Attorney, Agent, or Firm* — Suiter Swantz IP

(57) ABSTRACT

A method for in-situ swath positioning includes generating an in-situ swath positioning database by selecting a plurality of high contrast alignment targets from a set of pixel-to-design alignment images within a pixel-to-design alignment database. The method includes performing a first runtime swath of a plurality of runtime dies, where each runtime frame associated with the first runtime swath includes a high contrast alignment target from the in-situ swath positioning database. The method may include determining one or more offset values for each runtime die based on the plurality of high contrast alignment targets and one or more runtime frames associated with the first runtime swath. The one or more offset values may include an x-offset value and a y-offset value for each die. The method may include adjusting an initial stage position based on the determined one or more offset values prior to performing a second runtime swath.

20 Claims, 7 Drawing Sheets

(56) References Cited

U.S. PATENT DOCUMENTS

| | | | | |
|---|---|---|---|---|
| 2011/0286656 | A1 | 11/2011 | Kulkarni et al. | |
| 2019/0139209 | A1* | 5/2019 | Lee | G06T 7/001 |
| 2020/0126830 | A1 | 4/2020 | Dowling et al. | |
| 2021/0174483 | A1* | 6/2021 | Zhang | G01N 21/9501 |
| 2021/0242059 | A1* | 8/2021 | Chen | G06T 7/001 |
| 2022/0084856 | A1* | 3/2022 | Hiroi | G01N 21/9501 |
| 2022/0301136 | A1* | 9/2022 | Hiroi | G06T 7/001 |

* cited by examiner

SYSTEM AND METHOD FOR IN-SITU SWATH POSITIONING

CROSS-REFERENCE TO RELATED APPLICATIONS

The present application claims the benefit under 35 U.S.C § 119 (e) of U.S. Provisional Application Ser. No. 63/603,119, filed Nov. 28, 2023, which is incorporated herein by reference in the entirety.

TECHNICAL FIELD

The present disclosure relates generally to sample inspection and, more particularly, to a system and method for in-situ swath positioning.

BACKGROUND

Demand for electronic logic and memory devices with ever-smaller footprints and features present a wide range of manufacturing challenges beyond fabrication at a desired scale. In the context of semiconductor fabrication, identifying defects in semiconductor devices is an important step in improving throughput and yield. For example, defects may be identified by generating a target image of a target die and subtracting a reference image of a reference die from the target image, or vice versa. Differences between the images may thus represent defects.

For defect identification to be accurate, respective pixels in the target image should correspond to the same location on the die as respective pixels in the reference image. As such, samples should be accurately aligned to ensure correspondence in the target and reference images. However, stage location errors present challenges for target to reference image alignment. For example, misalignment between the sample and the stages of the inspection sub-system may negatively impact the accuracy of defect identification. Additionally, current runtime alignment techniques provide only relative offsets between neighboring dies, however, the first and last die in the swath may have large offsets. Further, the surface metric calculation of current runtime alignment techniques assumes the images are relatively high contrast, however, as design nodes have decreased, most images have become low contrast.

Therefore, it is desirable to provide systems and methods for curing one or more of the above deficiencies.

SUMMARY

A system for in-situ swath positioning is disclosed, in accordance with one or more embodiments of the present disclosure. In embodiments, the system includes a controller including one or more processors configured to execute a set of program instructions stored in memory. In embodiment, the set of program instructions are configured to cause the one or more processors to: generate an in-situ swath positioning database by selecting a set of a plurality of images of a plurality of high contrast alignment targets from a set of pixel-to-design alignment images within a pixel-to-design alignment database. In embodiment, the set of program instructions are configured to cause the one or more processors to generate one or more control signals configured to cause an inspection sub-system to perform a first runtime swath of a plurality of runtime dies on the runtime sample, where each runtime frame associated with the first runtime swath including at least one high contrast alignment target from the in-situ swath positioning database, where the inspection sub-system performs the first runtime swath of the plurality of runtime dies on the runtime sample when a sample stage of the inspection sub-system is in an initial stage position. In embodiment, the set of program instructions are configured to cause the one or more processors to determine one or more offset values for each runtime die based on the plurality of high contrast alignment targets of the generated in-situ swath positioning database and one or more runtime frames associated with the first runtime swath of the sample, where the one or more offset values include at least an x-offset value and a y-offset value for each die. In embodiment, the set of program instructions are configured to cause the one or more processors to generate one or more control signals configured to cause the inspection sub-system to adjust the initial stage position based on the determined one or more offset values prior to performing a second runtime swath of the plurality of runtime dies on the runtime sample.

A system for in-situ swath positioning is disclosed, in accordance with one or more embodiments of the present disclosure. In embodiments, the system includes an inspection sub-system. In embodiments, the system includes a controller communicatively coupled to the inspection sub-system. In embodiments, the controller includes one or more processors configured to execute a set of program instructions stored in memory. In embodiment, the set of program instructions are configured to cause the one or more processors to generate an in-situ swath positioning database by selecting a set of a plurality of images of a plurality of high contrast alignment targets from a set of pixel-to-design alignment images within a pixel-to-design alignment database. In embodiment, the set of program instructions are configured to cause the one or more processors to generate one or more control signals configured to cause the inspection sub-system to perform a first runtime swath of a plurality of runtime dies on the runtime sample, where each runtime frame associated with the first runtime swath including at least one high contrast alignment target from the in-situ swath positioning database, where the inspection sub-system performs the first runtime swath of the plurality of runtime dies on the runtime sample when a sample stage of the inspection sub-system is in an initial stage position. In embodiment, the set of program instructions are configured to cause the one or more processors to determine one or more offset values for each runtime die based on the plurality of high contrast alignment targets of the generated in-situ swath positioning database and one or more runtime frames associated with the first runtime swath of the sample, where the one or more offset values include at least an x-offset value and a y-offset value for each die. In embodiment, the set of program instructions are configured to cause the one or more processors to generate one or more control signals configured to cause the inspection sub-system to adjust the initial stage position based on the determined one or more offset values prior to performing a second runtime swath of the plurality of runtime dies on the runtime sample.

A method is disclosed, in accordance with one or more embodiments of the present disclosure. In embodiments, the method includes generating an in-situ swath positioning database by selecting a set of a plurality of images of a plurality of high contrast alignment targets from a set of pixel-to-design alignment images within a pixel-to-design alignment database. In embodiments, the method includes generating one or more control signals configured to cause an inspection sub-system to perform a first runtime swath of a plurality of runtime dies on the runtime sample, where each runtime frame associated with the first runtime swath including at least one high contrast alignment target from the in-situ swath positioning database, where the inspection sub-system performs the first runtime swath of the plurality of runtime dies on the runtime sample when a sample stage of the inspection sub-system is in an initial stage position. In embodiments, the method includes determining one or more offset values for each runtime die based on the plurality of high contrast alignment targets of the generated in-situ swath positioning database and one or more runtime frames associated with the first runtime swath of the sample, where the one or more offset values include at least an x-offset value and a y-offset value for each die. In embodiments, the method includes generating one or more control signals configured to cause the inspection sub-system to adjust the initial stage position based on the determined one or more offset values prior to performing a second runtime swath of the plurality of runtime dies on the runtime sample.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a system and method for in-situ swath positioning. For example, the system and method may include performing a pre-map swath to obtain images of pre-map sites of each die on the sample, where a high contrast image database is generated based on the pre-map swath images. The high contrast image database may be used to align dies to those saved during setup. An offset value in both the x- and y-direction may then be generated after each swath, where the offset values may be fed-forward to correct the stage positioning for future swaths.

It is contemplated herein that the system and method of the present disclosure may provide a number of advantages of previous approaches. For example, the system and method of the present disclosure may improve pre-map alignment accuracy by using high contrast images in alignment. By way of another example, the system and method of the present disclosure may improve pre-map robustness and improve alignment performance with images having reduced position shifts. As such, the system and method of the present disclosure may improve pre-map accuracy of the inspection sub-system, such that sensitivity performance is improved and entitlement of defect detection is increased.

Referring now to FIGS. 1-6, systems and methods for in-situ swath position are described in greater detail in accordance with one or more embodiments of the present disclosure.

Figure 1:
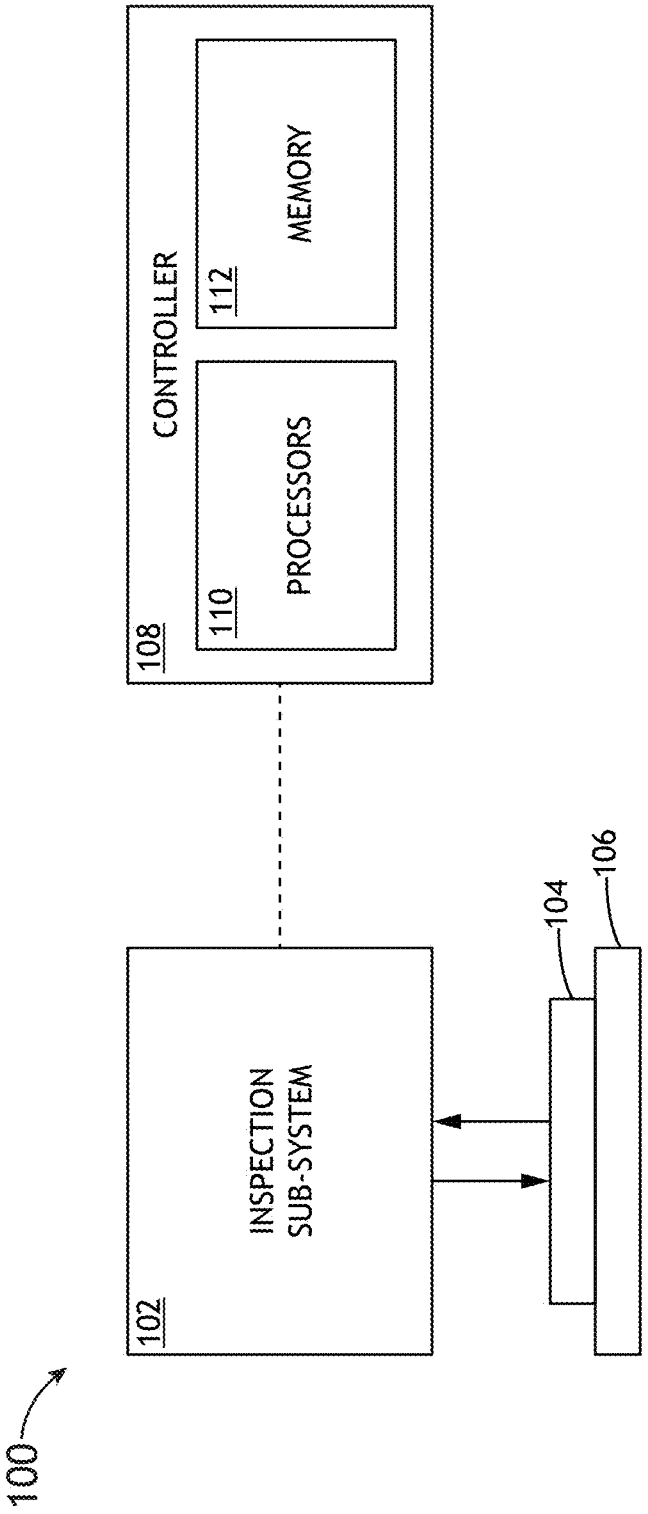
FIG. 1 illustrates a block diagram view of a system for in-situ swath positioning, in accordance with one or more embodiments of the present disclosure.

FIG. 1 illustrates a block diagram view of a system 100 for in-situ swath positioning, in accordance with one or more embodiments of the present disclosure. In embodiments, the system 100 includes an inspection sub-system 102 and a controller 108 communicatively coupled to the inspection sub-system 102.

The inspection sub-system 102 may be configured to inspect and/or image a sample 104 secured on a sample stage 106. The inspection sub-system 102 may include any inspection sub-system 102 known in the art. For example, the inspection sub-system 102 may include a broadband plasma (BBP) inspection sub-system 102.

The controller 108 may include one or more processors 110 and memory 112. The one or more processors 110 may be configured to execute a set of program instructions maintained in the memory 112. For example, the one or more processors 110 may be configured to perform a pre-map step to generate a plurality of pre-map images. By way of another example, the one or more processors 110 may be configured to perform a pixel-to-design alignment (PDA) step and generate a respective PDA database based on said PDA step. By way of another example, the one or more processors 110 may be configured to generate an in-situ swath positioning database based on PDA database by selecting a set of high contrast targets. By way of another example, the one or more processors 110 may be configured to generate one or more control signals configured to cause the inspection sub-system 102 to perform a first runtime swath. By way of another example, the one or more processors 110 may be configured to determine one or more offset values. By way of another example, the one or more processors 110 may be configured generate one or more control signals configured to cause the inspection sub-system 102 to adjust the initial stage position of the stage assembly 106 based on the determined one or more offset values prior to performing a second runtime swath of the plurality of dies on the sample 104.

The sample 104 may include any sample known in the art including, but not limited to, a wafer, a reticle, a photomask, flat panel display, and the like. For example, where the sample 104 includes a wafer, the wafer may include one or more dynamic random-access memory (DRAM) dies. In embodiments, the sample 104 is disposed on the stage assembly 106 to facilitate movement of the sample 104. For example, the stage assembly 106 may include an actuatable stage. For instance, the stage assembly 106 may include, but is not limited to, one or more translational stages suitable for selectively translating the sample 104 along one or more linear directions (e.g., x-direction, y-direction and/or z-direction). By way of another example, the stage assembly 106 may include, but is not limited to, one or more rotational stages suitable for selectively rotating the sample 104 along a rotational direction. By way of another example, the stage assembly 106 may include, but is not limited to, a rotational stage and a translational stage suitable for selectively translating the sample 104 along a linear direction and/or rotating the sample 104 along a rotational direction. It is noted herein that the system 100 may operate in any scanning mode known in the art.

Figure 2:
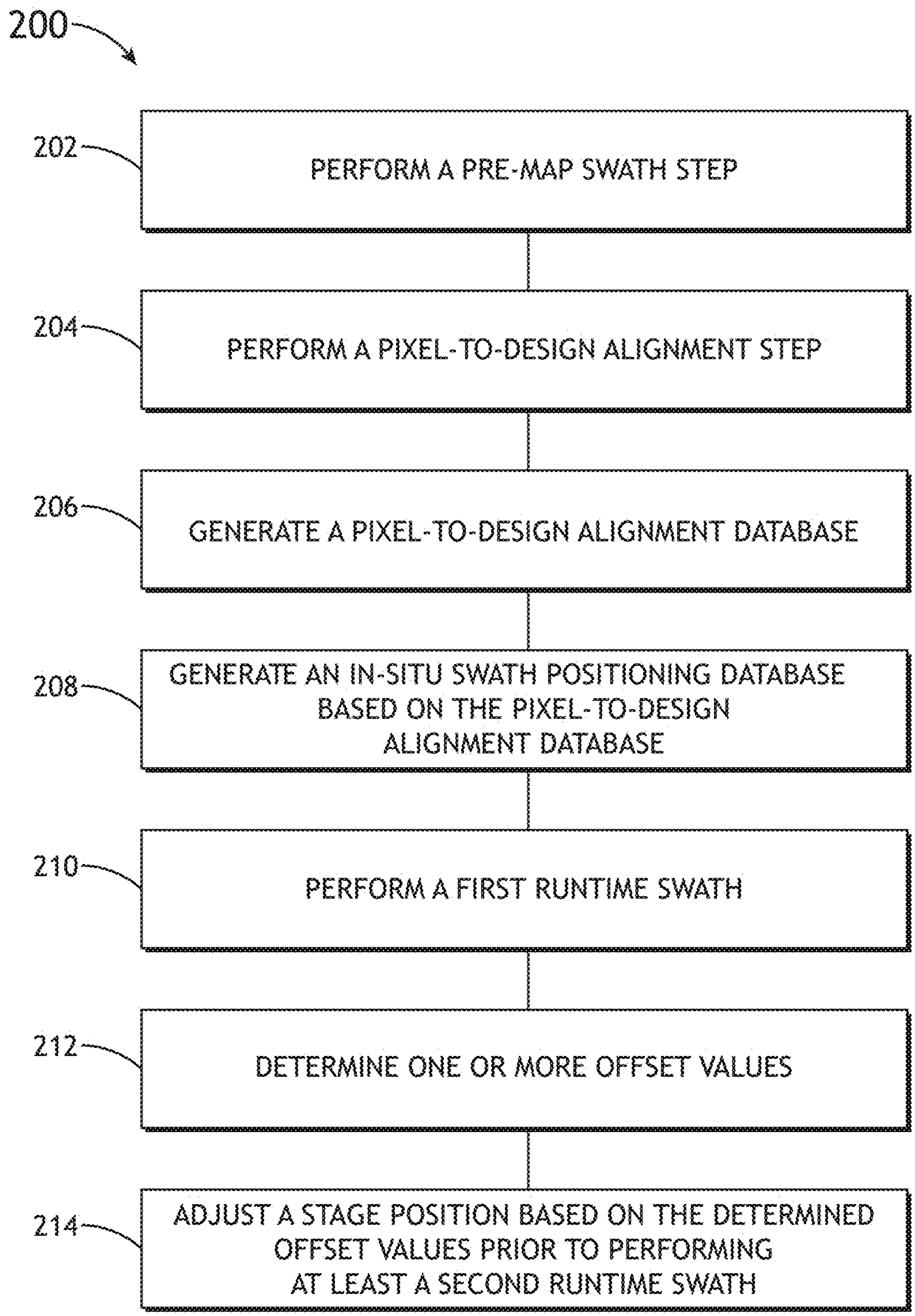
FIG. 2 illustrates a flow diagram illustrating a method for in-situ swath positioning, in accordance with one or more embodiments of the present disclosure.
Figure 3A:
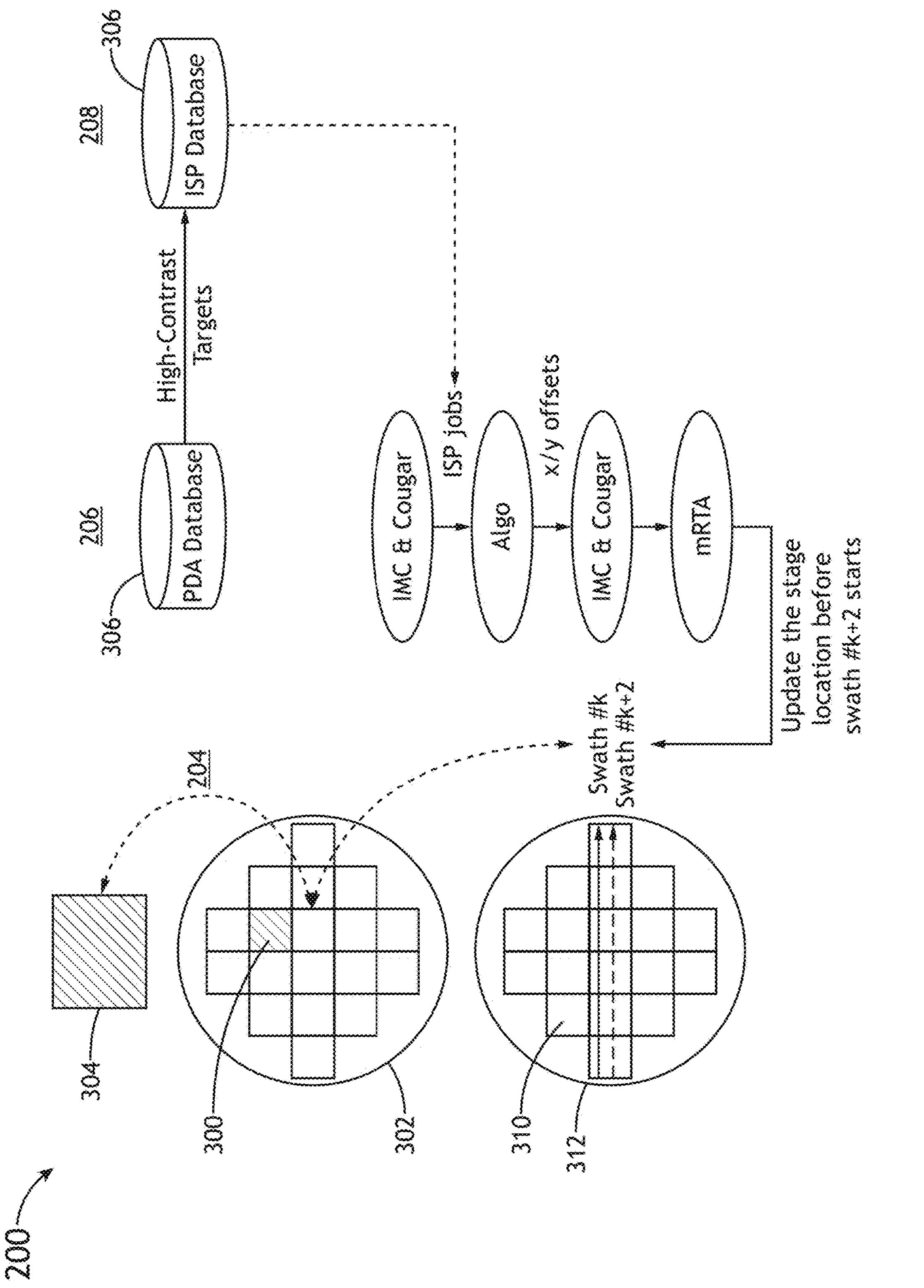
FIG. 3A illustrates a conceptual flow diagram depicting the method for in-situ swath positioning, in accordance with one or more embodiments of the present disclosure.
Figure 3B:
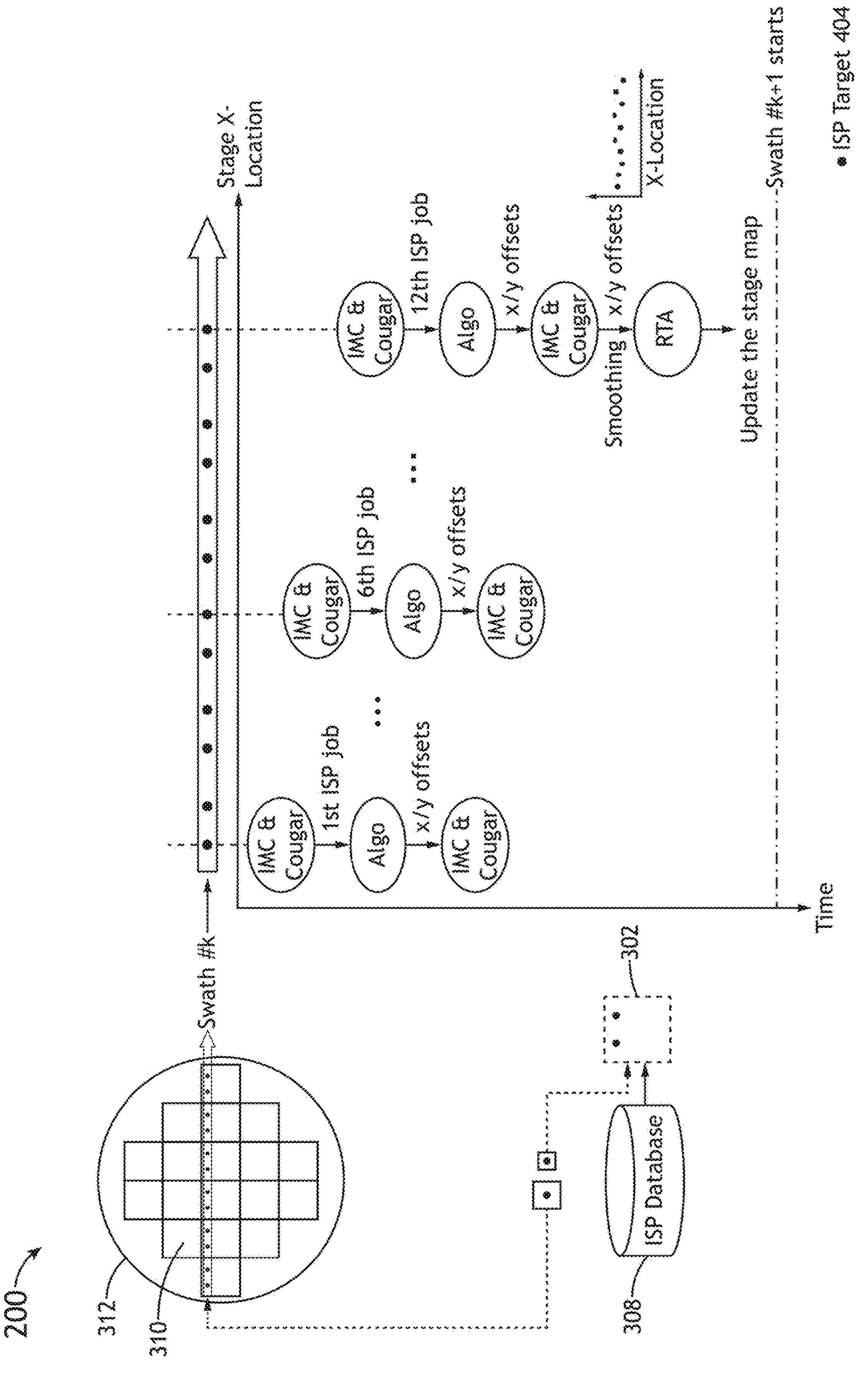
FIG. 3B illustrates a conceptual flow diagram depicting the method for in-situ swath positioning, in accordance with one or more embodiments of the present disclosure.

FIG. 2 illustrates a flow diagram depicting a method 200 of in-situ swath positioning, in accordance with one or more embodiments of the present disclosure. FIGS. 3A-3B illustrate conceptual flow diagrams depicting the method 200 of in-situ swath positioning, in accordance with one or more embodiments of the present disclosure. It is noted herein that the embodiments and enabling technologies described previously herein in the context of the system 100 should be interpreted to extend to the method 200. It is further noted, however, that the method 200 is not limited to the architecture of the system 100.

In embodiments, the method 200 includes a step 202 of performing a pre-map step to generate a plurality of pre-map images. For example, the inspection sub-system 102 may be configured to perform a pre-map swath (e.g., rough scan) of a plurality of dies on a sample when the stage assembly 106 is in an initial stage position and provide the plurality of pre-map images to the one or more processors 110. In this regard, the one or more processors 110 may receive the plurality of pre-map images from the inspection sub-system 102 after the pre-map swath has been performed on the plurality of dies on the sample 104.

In embodiments, the method includes a step 204 of performing a pixel-to-design alignment (PDA) step to align each setup die of a plurality of setup dies on a setup sample to a target design. For example, as shown in FIG. 3A, the one or more processors 110 may be configured to perform the PDA step to align each setup die 300 on a setup sample 302 (e.g., setup wafer 302) to a target design 304. The target design 304 may be a known design that is saved in memory 112 on the one or more controllers 108.

Pixel-to-design alignment (PDA) is generally discussed in U.S. Pat. No. 9,996,942, issued Jun. 12, 2018, and U.S. Pat. No. 11,049,745, issued Jun. 29, 2021, both of which are incorporated by reference in their entirety.

In embodiments, the method includes a step 206 of generating a pixel-to-design alignment (PDA) database based on the performed pixel-to-design alignment step (e.g., step 204). For example, the one or more processors 110 may be configured to generate the PDA database 306 based on the PDA step. The pixel-to-design alignment database 306 may include a set of pixel-to-design alignment images of a plurality of PDA targets for each swath of the setup sample 302.

In embodiments, the method 200 includes a step 208 of generating an in-situ swath positioning (ISP) database based on the PDA database 306. For example, the one or more processors 110 may be configured to generate the ISP database 308 based on the PDA database 306.

Figure 4:
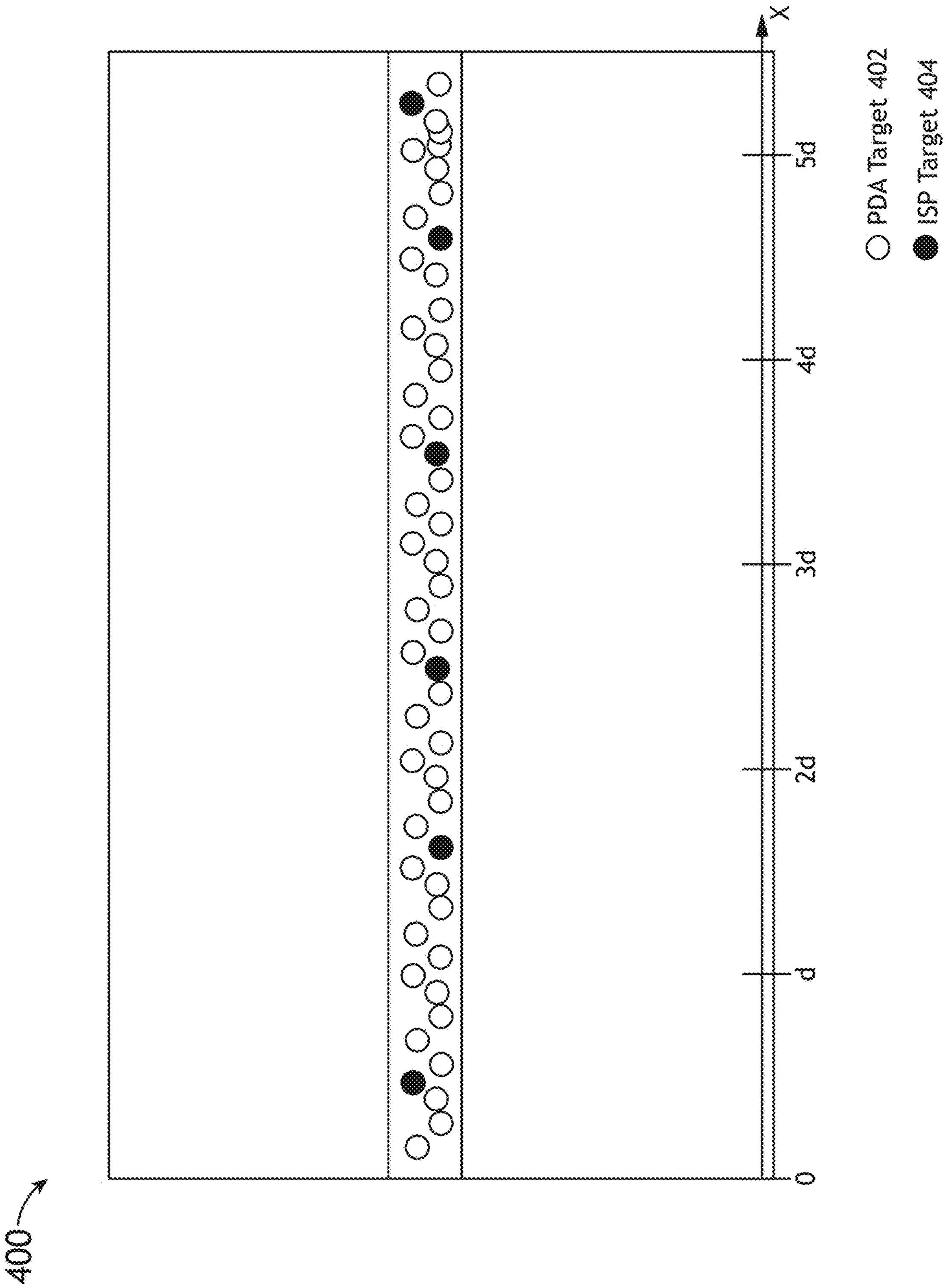
FIG. 4 illustrates a plot of a setup sample including a plurality of alignment targets and a plurality of high contrast targets over a selected interval, in accordance with one or more embodiments of the present disclosure.

FIG. 4 illustrates a plot of a setup sample 302 including a plurality of PDA targets 402 and a plurality of ISP targets 404 over a selected interval, in accordance with one or more embodiment of the present disclosure.

In embodiment, the one or more processors 110 may be configured to select a set of high contrast targets 404 (or ISP targets 404) from the plurality of PDA targets 402. For example, for each swath, the plurality of PDA targets 402 from the set of pixel-to-design alignment database 306 may be grouped into a plurality of intervals according to an x-location. For instance, as shown in FIG. 4, the PDA targets 402 may be grouped into a first interval d, a second interval 2*d*, a third interval 4*d*, a fourth interval 5*d*, and so on according to an x-location of the setup sample 302. For each interval, the one or more processors 110 may be configured select at least one high contrast alignment target 404 (or ISP target 404) from the PDA targets 402 based one or more pre-defined parameters to generate the in-situ swath positioning database 308.

It is contemplated herein that the high contrast target 404 may correspond to the image patch that has sharp features to ensure accurate image-to-image alignment. The high contrast target 404 may be selected based on one or more pre-defined parameters associated with ensuring accurate image-to-image alignment.

In embodiments, the one or more pre-defined parameters may include a PDA score, where a score above a predetermined threshold indicates that the target is good for alignment. For instance, the one or more processors 110 may be configured to rank the PDA targets 402 within a respective interval based on a level of image-contrast and select the PDA target 402 with the highest image-contrast based score as the ISP target 404 (or high contrast target 404).

In embodiments, the one or more pre-defined parameters may include having an image-contrast based score above a predetermined threshold. For example, the image-contrast based score may include normalized cross correlation (NCC) slopeness, NCC sharpness, or the like, where the image-contrast based score may be associated with characterizing how good the target is for alignment purposes.

In embodiments, the one or more pre-defined parameters may include characteristics of the image (or target. For example, the one or more pre-defined parameters may include determining whether there is a non-repeating pattern (e.g., the target or image patch does not contain a repeating pattern).

In embodiment, the method 200 includes a step 210 of generating one or more control signals configured to cause the inspection sub-system 102 to perform a first runtime swath (e.g., swath #k) of a plurality of runtime dies 310 on the runtime sample 312. For example, as shown in FIG. 3B, the inspection sub-system 102 may perform the first runtime swath associated with one or more runtime frames, where each runtime frame associated with the first runtime swath includes at least one high contrast alignment target from the in-situ swath positioning database. The inspection sub-system 102 may perform the first runtime swath of the plurality of runtime dies 310 on the runtime sample 312 when the sample stage 106 of the inspection sub-system 102 is in an initial stage position.

In embodiments, the method 200 includes a step 212 of determining one or more offset values for each runtime die 310 of a runtime sample 312. For example, the one or more processors 110 may be configured to determine one or more offset values based on the plurality of high contrast alignment targets 404 of the generated in-situ swath positioning database 308 and one or more runtime frames associated with the first runtime swath (e.g., swath #k) of the sample 312. For instance, the offset value may be determined by aligning the ISP target from the setup die and the ISP target from the runtime frame where the ISP target from the setup die is saved in the ISP database and the ISP target from the runtime frame is obtained by chopping the same-size image patch from the runtime frame according to a die location of the ISP target.

In embodiments, the one or more offset values may include at least an x-offset value and a y-offset value for each die, where the x-offset value is associated with a misalignment in the x-direction between the ISP target 404 of the setup die 302 and the ISP target 404 of the runtime die 308 and the y-offset value is associated with a misalignment in the y-direction between the ISP target 404 of the setup die 302 and the ISP target 404 of the runtime die 308. The x- and y-offset values may be associated with a stage location error, such that adjusted based on said offset values may correct the stage location error and thus improve defect detection accuracy (as discussed previously herein).

In embodiments, once the swath is executed, a set of offset values for each ISP target 404 may be generated. For example, as shown in FIG. 3B, the generated one or more offset values may then be plotted along the x-location. For instance, the one or more processors 110 may be configured to generate an average offset x/y offset value based on the plot of offsets.

In embodiments, the method 200 includes a step 214 of generating one or more control signals configured to cause the inspection sub-system 102 to adjust the initial stage position based on the determined one or more offset values prior to performing a second swath of the plurality of dies on the sample. For example, during runtime, the one or more processors 110 may be configured to generate an adjusted stage map based on the determined offset values (from step 212) and provide the adjusted stage map to the inspection sub-system 102 for adjustment thereof. In this regard, the inspection sub-system 102 may utilize the adjusted stage map when performing subsequent swaths (e.g., swath k #+1 or swath k #+2).

Figure 5:
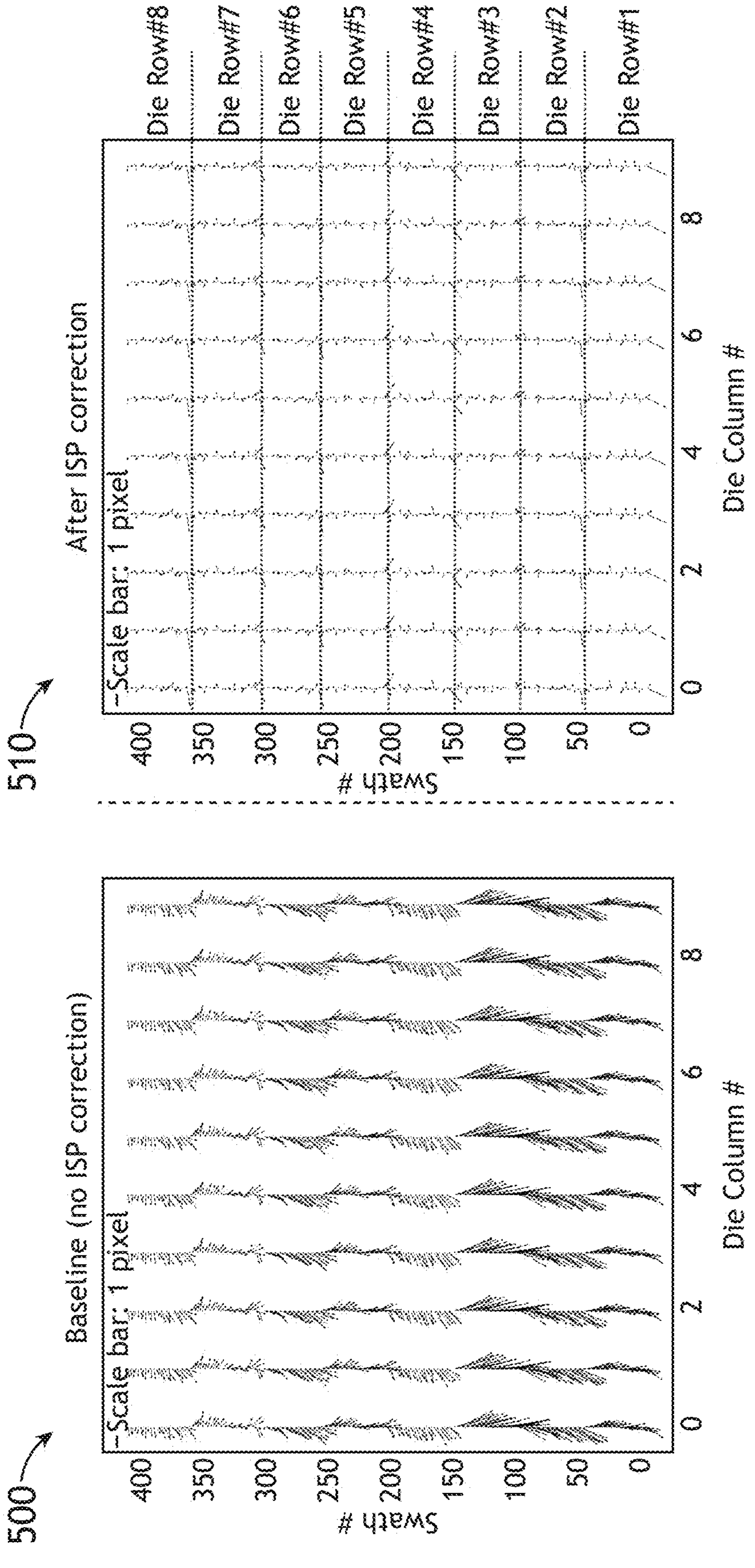
FIG. 5 illustrates a baseline quiver plot and an in-situ swath positioning quiver plot, in accordance with one or more embodiments of the present disclosure.

As previously discussed herein, the in-situ swath positioning system and method has a number of advantages over the previous system and methods. For example, FIG. 5 illustrates a baseline quiver plot 500 and an in-situ swath positioning quiver plot 510, in accordance with one or more embodiments of the present disclosure. As shown in FIG. 5, the stage location error decreases after applying in-situ swath position correction as discussed herein. For example, the baseline quiver plot 500 depicts relatively large stage location errors for the respective swaths and respective dies, where the respective stage location error of the ISP plot 510 is noticeably less.

Figure 6:
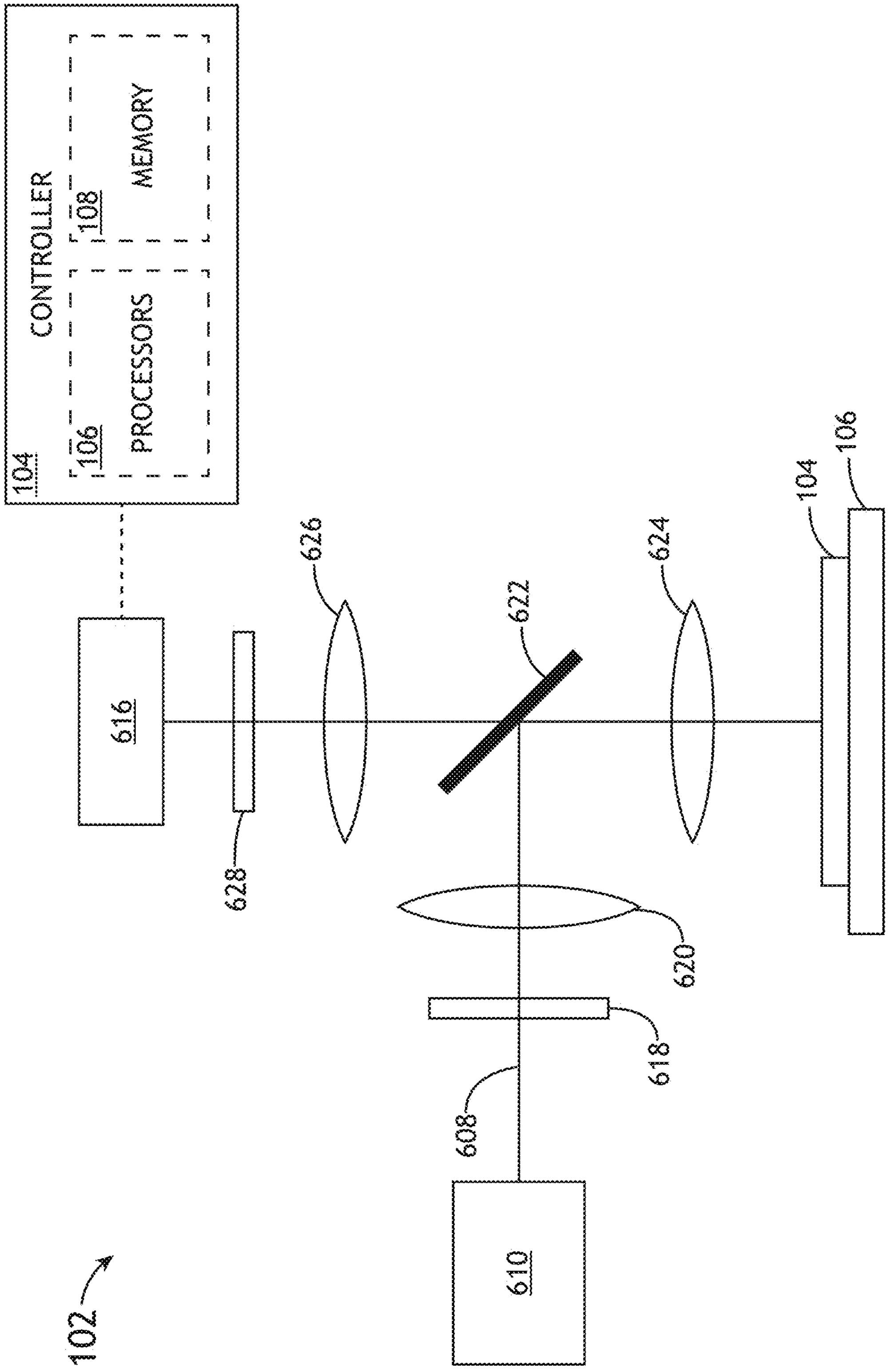
FIG. 6 illustrates a simplified schematic view of an inspection sub-system of the system for in-situ swath positioning, in accordance with one or more embodiments of the present disclosure.

FIG. 6 illustrates simplified schematic view of an inspection sub-system 102 of the system for in-situ swath positioning, in accordance with one or more embodiment of the present disclosure.

In embodiments, the inspection sub-system 102 includes one or more optical imaging sub-systems 102 (e.g., optical imaging tools) configured to generate one or more images of the sample 104, where the one or more optical imaging sub-systems 102 may be configurable to image the sample 104. For example, the optical imaging sub-system 102 may include an illumination sub-system configured to illuminate the sample 104 with illumination 608 from an illumination source 610 and a collection sub-system configured to generate an image of the sample 104 in response to light emanating from the sample (e.g., sample light) using a detector 616.

In embodiments, the illumination source 610 includes a broadband plasma (BBP) illumination source. In this regard, the illumination 608 may include radiation emitted by a plasma. For example, a BBP illumination source 610 may include, but is not required to include, one or more pump sources (e.g., one or more lasers) configured to focus into the volume of a gas, causing energy to be absorbed by the gas in order to generate or sustain a plasma suitable for emitting radiation. Further, at least a portion of the plasma radiation may be utilized as the illumination 608.

The illumination source 610 may further produce illumination 608 having any temporal profile. For example, the illumination source 610 may produce continuous-wave (CW) illumination 608, pulsed illumination 608, or modulated illumination 608. Additionally, the illumination 608 may be delivered from the illumination source 610 via free-space propagation or guided light (e.g., an optical fiber, a light pipe, or the like).

In embodiments, the illumination source 610 is configured to direct light to a surface of the sample 104 (via various optical components) disposed on the sample stage 106 via an illumination pathway. For example, the illumination pathway may include one or more illumination-pathway focusing elements 620, a beam splitter 622, or additional illumination-pathway optical components 618 suitable for modifying and/or conditioning the light 608. The inspection sub-system 102 may include an objective lens 624 to focus or otherwise direct the light 608 onto the sample 104. Further, the various optical components of the inspection sub-system 102 may be configured to direct light reflected and/or scattered from the surface of an inspected region of the sample 104 to the detector 616 of the inspection sub-system 102.

The inspection sub-system 102 may further image the sample 104 using any technique known in the art. In embodiments, the inspection sub-system 102 generates an image of the sample 104 in a scanning mode by focusing the illumination 608 onto the sample 104 as a spot or a line, capturing a point or line image, and scanning the sample 104 to build up a two-dimensional image. In this configuration, scanning may be achieved by moving the sample 104 with respect to the illumination 608 (e.g., using the translation stage 106), by moving the illumination 608 with respect to the sample 104 (e.g., using actuatable mirrors, or the like), or a combination thereof. In embodiments, the inspection sub-system 102 generates an image of the sample 104 in a static mode by directing the illumination 608 to the sample 104 in a two-dimensional field of view and capturing a two-dimensional image directly with the detector 616.

An image generated by the inspection sub-system 102 may be any type of image known in the art such as, but not limited to, a brightfield image, a darkfield image, a phase-contrast image, or the like. Further, images may be stitched together to form a composite image of the sample 104 or a portion thereof.

The detector 616 may include any type of sensor known in the art suitable for measuring sample light. For example, a detector 616 may include a multi-pixel sensor such as, but not limited to, a charge-couple device (CCD), a complementary metal-oxide-semiconductor (CMOS) device, a line sensor, or a time-delay-integration (TDI) sensor. As another example, a detector 616 may include two or more single-pixel sensors such as, but not limited to, a photodiode, an avalanche photodiode, a photomultiplier tube, or a singlephoton detector. The detector 616 may be used to detect defects on the sample 104 through a collection pathway. For example, the detector 616 may receive an image of the sample 104 provided by one or more optical elements in the collection pathway (e.g., the objective lens 624, one or more collection-pathway focusing elements 626, or the like). The collection pathway may further include any number of collection-pathway optical elements 628 to direct and/or modify illumination collected by the objective lens 624 including, but not limited to, one or more filters, one or more polarizers, or one or more beam blocks.

In embodiments, the detector 616 is communicatively coupled to the controller 108. In this regard, the controller 108 may be configured to detect defects on the sample 104 using detection data collected and transmitted by the detector 616.

Referring again to FIG. 1, additional components of the system 100 are described in greater detail in accordance with one or more embodiments of the present disclosure.

The one or more processors 110 of the controller 108 may generally include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 110 may include any device configured to execute algorithms and/or instructions (e.g., program instructions stored in memory). In one embodiment, the one or more processors 110 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 108 may include one or more controllers housed in a common housing or within multiple housings. In this way, any controller or combination of controllers may be separately packaged as a module suitable for integration into system 100. Further, the controller 108 may analyze or otherwise process data received from the inspection subsystem 102 and feed the data to additional components within the system 100 or external to the system 100.

Further, the memory device 112 may include any storage medium known in the art suitable for storing program instructions executable by the associated one or more processors 110. For example, the memory device 112 may include a non-transitory memory medium. As an additional example, the memory device 112 may include, but is not limited to, a read-only memory, a random-access memory, a magnetic or optical memory device (e.g., disk), a magnetic tape, a solid-state drive and the like. It is further noted that memory device 112 may be housed in a common controller housing with the one or more processors 110.

In this regard, the controller 108 may execute any of various processing steps associated with metrology and/or inspection. For example, the controller 108 may be configured to generate control signals to direct or otherwise control the inspection sub-system 102, or any components thereof. For instance, the controller 108 may be configured to direct the stage 106 to translate the sample 104 along one or more measurement paths or swaths. By way of another example, the controller 108 may be configured to receive images from the inspection sub-system 102. By way of another example, the controller 108 may generate correctables for one or more additional fabrication sub-systems as feedback and/or feed-forward control of the one or more additional fabrication tools (e.g., lithography tool) based on measurements from the inspection sub-system 102.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:

a controller including one or more processors configured to execute a set of program instructions stored in memory, the set of program instructions configured to cause the one or more processors to:

generate an in-situ swath positioning database by selecting a set of a plurality of images of a plurality of high contrast alignment targets from a set of pixel-to-design alignment images within a pixel-to-design alignment database;

generate one or more control signals configured to cause an inspection sub-system to perform a first runtime swath of a plurality of runtime dies on a runtime sample, wherein each runtime frame associated with the first runtime swath including at least one high contrast alignment target from the in-situ swath positioning database, wherein the inspection sub-system performs the first runtime swath of the plurality of runtime dies on the runtime sample when a sample stage of the inspection sub-system is in an initial stage position;

determine one or more offset values for each runtime die based on the plurality of high contrast alignment targets of the generated in-situ swath positioning database and one or more runtime frames associated with the first runtime swath of the runtime sample, wherein the one or more offset values include at least an x-offset value and a y-offset value for each die; and generate one or more control signals configured to cause the inspection sub-system to adjust the initial stage position based on the determined one or more offset values prior to performing a second runtime swath of the plurality of runtime dies on the runtime sample.

2. The system of claim 1, wherein the set of program instructions are further configured to cause the one or more processors to:

perform a pixel-to-design alignment step to align each setup die of a plurality of setup dies on a setup sample to a target design; and generate the pixel-to-design alignment database based on the performed pixel-to-design alignment step, the pixel-to-design alignment database including the set of pixel-to-design alignment images of the plurality of alignment targets for each setup swath of the setup sample.

3. The system of claim 1, wherein the generate an in-situ swath positioning database by selecting a set of a plurality of images of a plurality of high contrast alignment targets from a set of pixel-to-design alignment images within a pixel-to-design alignment database comprises:

for each swath, group the plurality of alignment targets from the set of pixel-to-design alignment images into a plurality of intervals according to an x-location; and for each interval, select at least one high contrast alignment target from the set of pixel-to-design alignment images based one or more pre-defined parameters to generate the in-situ swath positioning database, wherein the one or more pre-defined parameters include having a non-repeating pattern and having an image-contrast based score above a predetermined threshold.

4. The system of claim 1, wherein the set of program instructions are further configured to cause the one or more processors to:

generate a plot of the determined one or more offset values to determine an average offset value;

generate an adjusted stage map based on the determined average offset value; and provide the adjusted stage map to the sample stage to adjust the initial stage position.

5. The system of claim 1, wherein the set of program instructions are further configured to cause the one or more processors to:

identify one or more defects.

6. The system of claim 1, wherein the inspection sub-system comprises a broadband plasma inspection sub-system.

7. The system of claim 1, wherein the runtime sample comprises a wafer.

8. The system of claim 7, wherein the plurality of runtime dies include one or more dynamic random-access memory dies.

9. A system comprising:

an inspection sub-system; and a controller communicatively coupled to the inspection sub-system, the controller including one or more processors configured to execute a set of program instructions stored in memory, the set of program instructions configured to cause the one or more processors to:

generate an in-situ swath positioning database by selecting a set of a plurality of images of a plurality of high contrast alignment targets from a set of pixel-to-design alignment images within a pixel-to-design alignment database;

generate one or more control signals configured to cause the inspection sub-system to perform a first runtime swath of a plurality of runtime dies on a runtime sample, wherein each runtime frame associated with the first runtime swath including at least one high contrast alignment target from the in-situ swath positioning database, wherein the inspection sub-system performs the first runtime swath of the plurality of runtime dies on the runtime sample when a sample stage of the inspection sub-system is in an initial stage position;

determine one or more offset values for each runtime die based on the plurality of high contrast alignment targets of the generated in-situ swath positioning database and one or more runtime frames associated with the first runtime swath of the sample, wherein the one or more offset values include at least an x-offset value and a y-offset value for each die; and generate one or more control signals configured to cause the inspection sub-system to adjust the initial stage position based on the determined one or more offset values prior to performing a second runtime swath of the plurality of runtime dies on the runtime sample.

10. The system of claim 9, wherein the set of program instructions are further configured to cause the one or more processors to:

perform a pixel-to-design alignment step to align each setup die of a plurality of setup dies on a setup sample to a target design; and generate the pixel-to-design alignment database based on the performed pixel-to-design alignment step, the pixel-to-design alignment database including the set of pixel-to-design alignment images of the plurality of alignment targets for each setup swath of the setup sample.

11. The system of claim 9, wherein the generate an in-situ swath positioning database by selecting a set of a plurality of images of a plurality of high contrast alignment targets from a set of pixel-to-design alignment images within a pixel-to-design alignment database comprises:

for each swath, group the plurality of alignment targets from the set of pixel-to-design alignment images into a plurality of intervals according to an x-location; and for each interval, select at least one high contrast alignment target from the set of pixel-to-design alignment images based one or more pre-defined parameters to generate the in-situ swath positioning database, wherein the one or more pre-defined parameters include having a non-repeating pattern and having an image-contrast based score above a predetermined threshold.

12. The system of claim 9, wherein the set of program instructions are further configured to cause the one or more processors to:

generate a plot of the determined one or more offset values to determine an average offset value;

generate an adjusted stage map based on the determined average offset value; and provide the adjust stage map to the sample stage to adjust the initial stage position.

13. The system of claim 9, wherein the set of program instructions are further configured to cause the one or more processors to:

identify one or more defects.

14. The system of claim 9, wherein the inspection sub-system comprises a broadband plasma inspection sub-system.

15. The system of claim 9, wherein the runtime sample comprises a wafer.

16. The system of claim 15, wherein the plurality of runtime dies include one or more dynamic random-access memory dies.

17. A method comprising:

generating an in-situ swath positioning database by selecting a set of a plurality of images of a plurality of high contrast alignment targets from a set of pixel-to-design alignment images within a pixel-to-design alignment database;

generating one or more control signals configured to cause an inspection sub-system to perform a first runtime swath of a plurality of runtime dies on a runtime sample, wherein each runtime frame associated with the first runtime swath including at least one high contrast alignment target from the in-situ swath positioning database, wherein the inspection sub-system performs the first runtime swath of the plurality of runtime dies on the runtime sample when a sample stage of the inspection sub-system is in an initial stage position;

determining one or more offset values for each runtime die based on the plurality of high contrast alignment targets of the generated in-situ swath positioning database and one or more runtime frames associated with the first runtime swath of the sample, wherein the one or more offset values include at least an x-offset value and a y-offset value for each die; and generating one or more control signals configured to cause the inspection sub-system to adjust the initial stage position based on the determined one or more offset values prior to performing a second runtime swath of the plurality of runtime dies on the runtime sample.

18. The method of claim 17, further comprising:

perform a pixel-to-design alignment step to align each setup die of a plurality of setup dies on a setup sample to a target design; and generate the pixel-to-design alignment database based on the performed pixel-to-design alignment step, the pixel-to-design alignment database including the set of pixel-to-design alignment images of the plurality of alignment targets for each setup swath of the setup sample.

19. The method of claim 17, wherein the generating an in-situ swath positioning database by selecting a set of a plurality of images of a plurality of high contrast alignment targets from a set of pixel-to-design alignment images within a pixel-to-design alignment database comprises:

for each swath, grouping the plurality of alignment targets from the set of pixel-to-design alignment images into a plurality of intervals according to an x-location; and for each interval, selecting at least one high contrast alignment target from the set of pixel-to-design alignment images based one or more pre-defined parameters to generate the in-situ swath positioning database, wherein the one or more pre-defined parameters include having a non-repeating pattern and having an image-contrast based score above a predetermined threshold.

20. The method of claim 17, further comprising:

generating a plot of the determined one or more offset values to determine an average offset value;

generating an adjusted stage map based on the determined average offset value; and providing the adjust stage map to the sample stage to adjust the initial stage position.

* * * * *